United States Patent
Shim et al.

(10) Patent No.: US 10,136,261 B2
(45) Date of Patent: Nov. 20, 2018

(54) METHOD AND APPARATUS TO TRANSMIT AND RECEIVE DATA BASED ON LOCATION

(71) Applicant: Samsung Electronics Co., Ltd., Suwon-si (KR)

(72) Inventors: Jae Wook Shim, Yongin-si (KR); Gyu Bum Kyung, Seoul (KR); Ho Yang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 797 days.

(21) Appl. No.: 14/502,253

(22) Filed: Sep. 30, 2014

(65) Prior Publication Data

US 2015/0141058 A1 May 21, 2015

(30) Foreign Application Priority Data

Nov. 19, 2013 (KR) .................. 10-2013-0140739

(51) Int. Cl.
*H04W 24/00* (2009.01)
*H04W 4/02* (2018.01)
*G01S 5/00* (2006.01)
*H04W 4/029* (2018.01)

(52) U.S. Cl.
CPC ........... *H04W 4/028* (2013.01); *G01S 5/0027* (2013.01); *H04W 4/029* (2018.02)

(58) Field of Classification Search
None
See application file for complete search history.

(56) References Cited

U.S. PATENT DOCUMENTS

| | | | | |
|---|---|---|---|---|
| 8,495,237 B1* | 7/2013 | Bilinski | ............ | H04L 65/1083 709/224 |
| 2003/0016694 A1* | 1/2003 | Schneider | ........... | H04L 12/2856 370/463 |
| 2003/0156561 A1* | 8/2003 | Padovani | ............. | H04B 7/0814 370/335 |
| 2009/0274074 A1* | 11/2009 | Astely | .................. | H04B 7/0619 370/280 |
| 2010/0323715 A1* | 12/2010 | Winters | ................ | G01S 5/0027 455/456.1 |
| 2012/0208562 A1* | 8/2012 | Wilkin | ................ | H04L 41/5067 455/456.3 |
| 2012/0263089 A1 | 10/2012 | Gupta et al. | | |

* cited by examiner

*Primary Examiner* — Jinsong Hu
*Assistant Examiner* — Alexander Yi
(74) *Attorney, Agent, or Firm* — NSIP Law

(57) ABSTRACT

An apparatus and method for transmitting and receiving data based on a location is disclosed, the apparatus for receiving the data, for example, a data receiver includes a location predictor configured to predict a location of the receiver based on location information of the receiver, a data rate calculator configured to calculate a predicted data rate during an interval based on communication environment information corresponding to the location of the receiver and the predicted location, and a buffer configured to backlog data received in advance based on the predicted data rate.

24 Claims, 8 Drawing Sheets

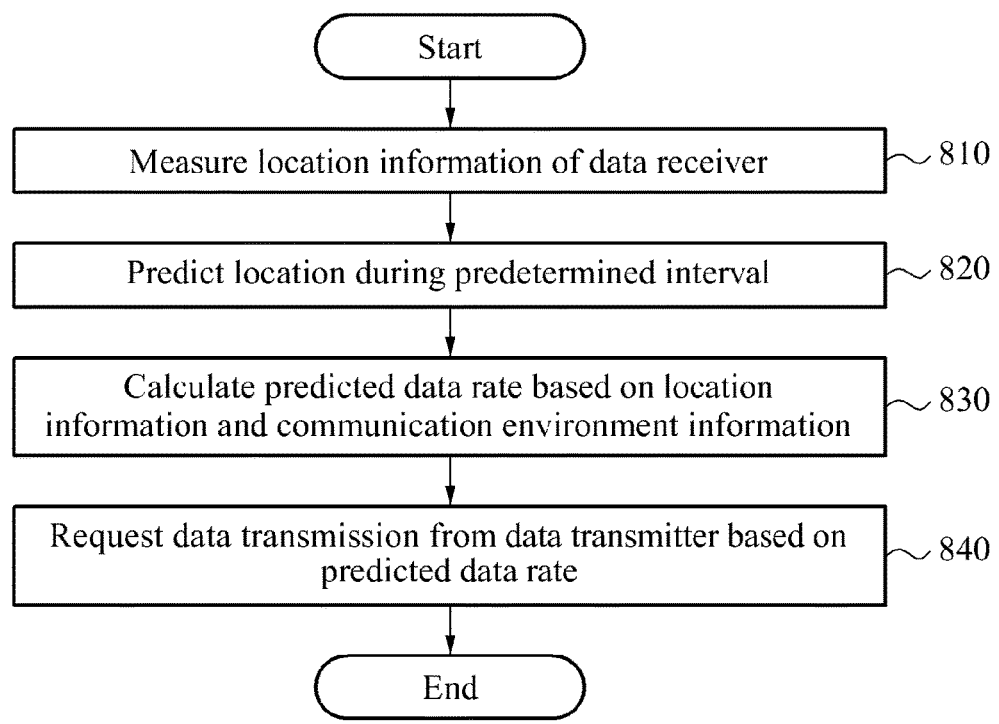

METHOD AND APPARATUS TO TRANSMIT AND RECEIVE DATA BASED ON LOCATION

CROSS-REFERENCE TO RELATED APPLICATION

This application claims the benefit under 35 USC 119(a) of Korean Patent Application No. 10-2013-0140739, filed on Nov. 19, 2013, in the Korean Intellectual Property Office, the entire disclosure of which is incorporated herein by reference for all purposes.

BACKGROUND

1. Field

The following description relates to an apparatus and method of transmitting and receiving content through a network.

2. Description of Related Art

When content, such as multimedia, is received through a network, a change in a transmission data rate of the network may influence a continuous flow of content for playback. For example, in an ideal network reception state, normal playback is possible by receiving a sufficient quantity of data that is needed for playback during a period of time. In a poor network reception state, failing to receive a sufficient quantity of data may lead to an intermittent connection during media playback.

A change in a transmission data rate occurring in a poor connection state may be compensated by backlogging data received for continuous content playback in a buffer. The data may be read and played from the buffer when a predetermined quantity of data is secured in the buffer subsequent to a predetermined period of latency has elapsed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a data receiver, the receiver including a location predictor configured to predict a location of the receiver based on location information of the receiver, a data rate calculator configured to calculate a predicted data rate during an interval based on communication environment information corresponding to the location of the receiver and the predicted location, and a buffer configured to backlog data received in advance based on the predicted data rate. The location predictor may be further configured to calculate at least one of a moving path or a moving speed of the receiver based on location information measured at intervals.

The receiver may include a communicator configured to transmit the predicted data rate to a data transmitter and to receive the data at the predicted data rate from the receiver.

The data rate calculator may be further configured to calculate the predicted data rate based on at least one of a first data rate required to receive data during a current interval, a second data rate required to receive data during the interval, a quantity of the data backlogged in the buffer in advance, or a reference quantity of the buffer.

The data rate calculator may be further configured to determine the predicted data rate by reducing a difference between the reference quantity of the buffer and the quantity of the data backlogged in advance from a sum of the first data rate and the second data rate.

The data rate calculator may be further configured to calculate the predicted data rate by applying a weight to at least one of the first data rate, the second data rate, the quantity of the data backlogged in advance, or the reference quantity of the buffer.

The data rate calculator may be further configured to apply an additional data rate to the predicted data rate.

The receiver may include a location measurer configured to measure the location of the receiver based on at least one of global positioning system (GPS) information or location information of a network to which the receiver is connected.

The receiver may include a data rate updater configured to update the communication environment information based on a data reception rate of the receiver at the location of the receiver.

The communication environment information may be provided by a database.

The predicted data rate may be associated with a data rate required for uninterrupted play of a data.

The receiver may include a first communication environment searcher configured to search for a transmission data rate along the moving path of the receiver.

In another general aspect, there is provided a location-based data transmitter, the transmitter including a location receptor configured to receive location information of a data receiver, a location predictor configured to predict a location of the receiver during an interval based on the location information, and a data rate calculator configured to calculate a predicted data rate during the interval based on communication environment information corresponding to the location of the receiver and the predicted location.

The location predictor may be further configured to calculate a moving path or a moving speed of the receiver based on the location information received at intervals.

The transmitter may include a communicator configured to transmit the data to the receiver based on the predicted data rate.

The data rate calculator may be further configured to calculate the predicted data rate based on at least one of a first data rate required to receive data during a current interval, a second data rate required to receive data during the interval based on a change in the communication environment information, a quantity of data backlogged in a buffer in advance, or a reference quantity of the buffer.

The data rate calculator may be further configured to determine the predicted data rate by reducing a difference between the reference quantity of the buffer and the quantity backlogged in advance from a sum of the first data rate and the second data rate.

The data rate calculator may be configured to calculate the predicted data rate by applying a weight to at least one of the first data rate, the second data rate, the quantity of the data, or the reference quantity backlogged in advance.

The data rate calculator may be further configured to apply an additional data rate to the predicted data rate.

In another general aspect, there is provided a method of receiving data based on a location, the method including predicting a location of a location-based data receiver during an interval based on location information of the receiver, calculating a predicted data rate during the interval based on communication environment information corresponding to the location of the receiver and the predicted location, and receiving and backlogging the data, at a data receiver, based on the predicted data rate.

The calculating includes calculating the predicted data rate based on at least one of a first data rate required to receive data during a current time interval, a second data rate required to receive the data during the interval based on a change in the communication environment information, a quantity of the data backlogged in a buffer in advance, or a reference quantity of the buffer.

The method may include measuring the location of the receiver based on at least one of global positioning system (GPS) information or location information of a network to which the receiver is connected.

The method may include mapping a data rate when the receiver receives the data to the location of the receiver, and sending feedback to the database.

In another general aspect, there is provided a method of receiving uninterrupted data based on a location, the method including determining an amount of data to be stored in a buffer of a receiver for uninterrupted execution of the data during a period of time, predicting a location of a receiver during the period, calculating a data transmission rate during the period based on communication environment information corresponding to the location and the predicted location, wherein the data transmission rate is adequate to maintain the amount of the data.

The communication environment information may be provided by a database.

The method may include providing feedback information comprising a data transmission rate and the location of the receiver when the receiver received the data.

The method may include maintaining an additional amount of data in the buffer to compensate for a difference between an actual data transmission rate and the calculated data transmission rate.

Other features and aspects will be apparent from the following detailed description, drawings, and claims.

BRIEF DESCRIPTION OF THE DRAWINGS

FIG. 8 is a diagram illustrating an example of a method of receiving data based on a location.

Figure 1:
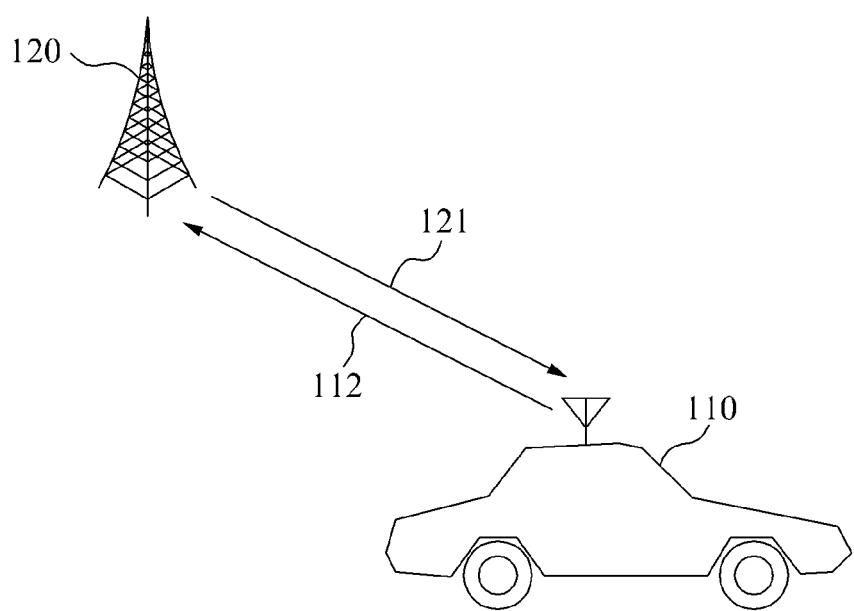
FIG. 1 is a diagram illustrating an example of a mobile environment in which data is transmitted and received.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 is a diagram illustrating an example of a mobile environment in which data 121 is transmitted and received. Referring to FIG. 1, a method of steadily receive data 121 from a data transmitter 120 at a data receiver 110 is shown. The data is transmitted by compensating for a change in a reception quality, for example, delay and disconnection, of a network based on an environment through dynamic buffering. The data 121, may be any data, such as, for example, multimedia data, voice, character, image, video, or a combination of these or other forms of data.

In a mobile wireless communication environment, a change in a network state may be more severe than in a wired communication environment because of surrounding topographical features and obstacles due to a movement of a user. In the mobile wireless communication environment, the data receiver 110 compensates for a change in a transmission data rate by backlogging a greater quantity of data 121 in a buffer than when in the wired communication environment. A quantity of a memory used and a quantity of a power consumed may increase because a greater quantity of the data 121 is backlogged in advance using a bigger buffer. The space available in a memory, which can be used by other applications, such as, for example, software, camera, sensors, sharing the memory within the data receiver 110 may decrease, and expenses to expand the memory may be incurred.

The data receiver 110 and the data transmitter 120 prevent a loss of connection during media playback in a content player. The data receiver 110 and the data transmitter 120 also optimize the quantity of the memory used and the quantity of the power consumed by the data receiver 110 by predicting based on location information 112 of a user and adjusting a quantity of data, for example, a buffer size, backlogged in the buffer when the user moves to a poor reception area.

Figure 2:
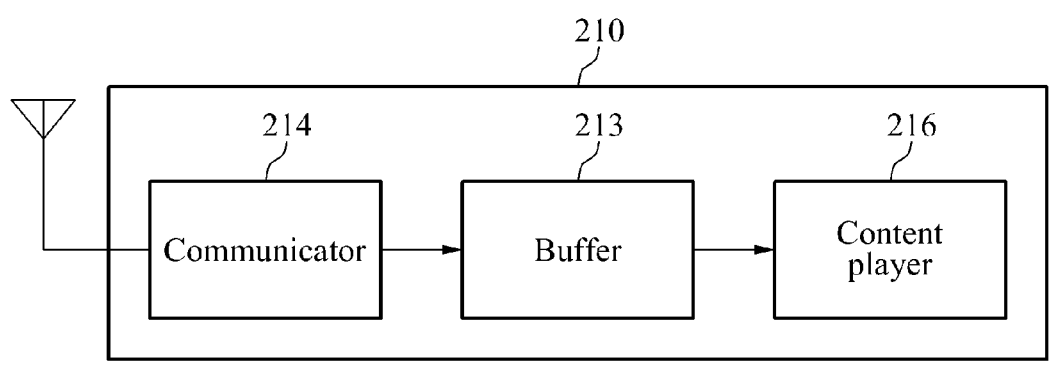
FIG. 2 is a diagram illustrating an example of a configuration of a data receiver.

FIG. 2 is a diagram illustrating an example of a configuration of a data receiver 210.

The data receiver 210 receives data through a communicator 214 in advance, backlogs the data in a buffer 213, and reads the data from the buffer 213 to play the data. This prevents connection from being lost during media playback due to a change in a data reception rate in a network environment. In a mobile environment in which the data is received wirelessly, the change in the data reception rate based on user circumstances may be more drastic.

For example, when the user moves to a geographically poor reception area, for example, an underground parking, a tunnel, a valley surrounded by hills, or in a center of downtown skyscrapers, a loss of connection may occur in services provided by a content player 216. The change in the data reception rate may be compensated by using the buffer 213 of a larger size that backlogs a greater quantity of data in advance. A continuous use of the larger size buffer 213, however, may lead to an increase in a quantity of a power consumed and a quantity of memory used. Thereby, requiring the data receiver 210 to have a larger memory.

Figure 3:
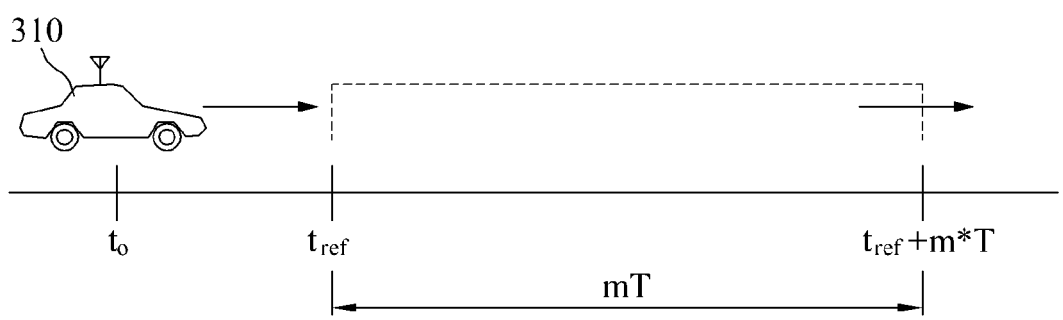
FIG. 3 is a diagram illustrating an example of a time interval based on a change in a location of a location-based data receiver.

FIG. 3 is a diagram illustrating an example of a time interval based on a change in a location of a location-based data receiver 310. The size of a buffer may be adjusted by dynamically adjusting a transmission data rate based on location information of a user in order to reduce an average quantity of a buffer memory used and to prevent data disconnection. For example, a location of the user is predicted during an interval from a reference point in time $t=t_{ref}$ to (m*T). A change in a transmission data rate in a predicted moving path of the location-based data receiver 310, hereinafter also referred to as a data receiver, is predicted during a predetermined interval, for example, $t_{ref} \leq t < m*T+t_{ref}$. A quantity of data $D(t_{ref})$ to be backlogged in the buffer of the data receiver 310 at the reference point in time $t=t_{ref}$ is dynamically controlled in order to compensate for the predicted change in the transmission data rate.

Figure 4:
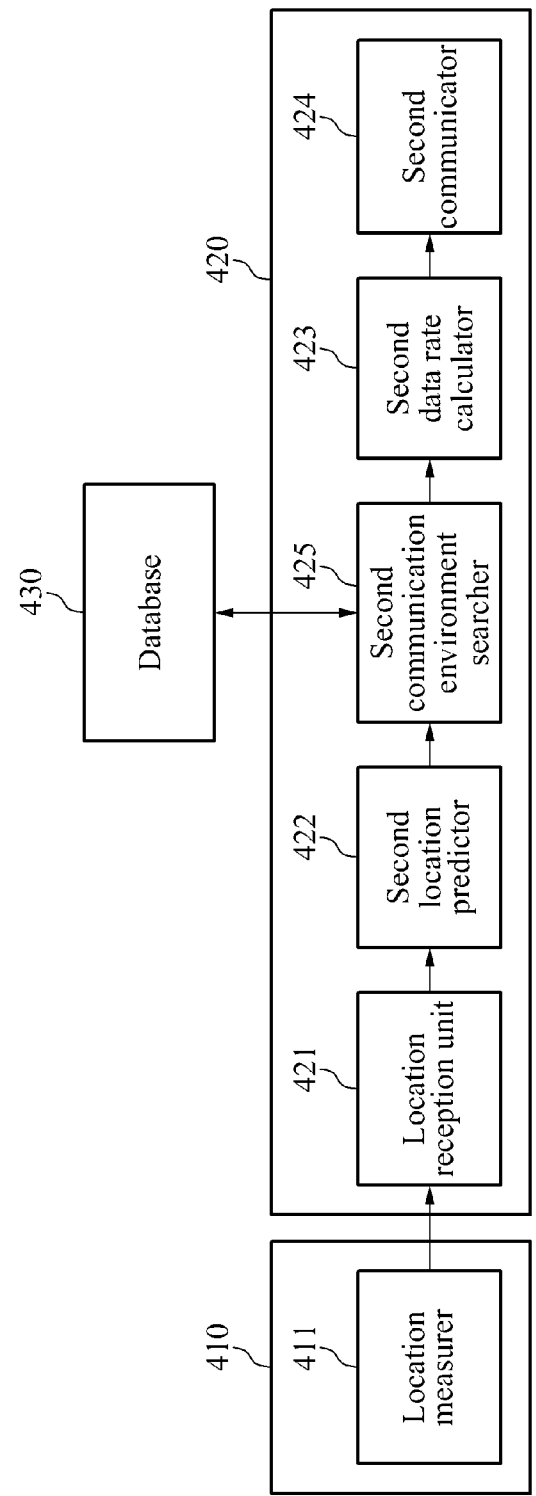
FIG. 4 is a block diagram illustrating an example of a configuration of a location-based data transmitter.

FIG. 4 is a block diagram illustrating an example of a configuration of a location-based data transmitter 420.

Referring to FIG. 4, the location-based data transmitter 420, hereinafter also referred to as a data transmitter, includes a location reception unit 421, a second location predictor 422, a second data rate calculator 423, a second communicator 424, and a second communication environment searcher 425. The second communicator 424 transmits data during a current interval based on a predicted data rate calculated by the second data rate calculator 423. A process to calculate the predicted data rate will be described later.

When a data receiver 410 moves, a location measurer 411 of the data receiver 410 measures a location of the data receiver 410 at "T" intervals, and transmits the measured location to the location reception unit 421 of the data transmitter 420 along with a measured time. For example, the "T" interval refers to a time interval, and "T" may be predetermined by a user based on a communication environment and a performance of the data receiver 410 and the data transmitter 420.

The second location predictor 422 of the data transmitter 420 predicts, at "T" intervals, a moving path of the data receiver 410 based on location information of the data receiver 410 received from the location reception unit 421. The second location predictor 422 also calculates a moving direction and a moving speed calculated from the location information. The second location predictor 422 predicts the location and a change in the location of the data receiver 410 during a predetermined interval based on the measured location information. In another example, the location and the change in the location of the data receiver 410 may be predicted based on a movement pattern of the data receiver 410.

The second communication environment searcher 425 of the data transmitter 420 searches a transmission data rate based on the change in the location of the data receiver 410 during an interval of $t_{ref} \leq t < m*T+t_{ref}$ from a database 430. The database 430 stores communication environment information corresponding to the location of the data receiver 410.

In an example, the communication environment information includes a data rate corresponding to a current location of the data receiver 410, a data rate corresponding to the predicted location of the data receiver 410, or a data rate corresponding to a predetermined location.

The second data rate calculator 423 of the data transmitter 420 calculates a data quantity to be backlogged in a buffer of the data receiver 410 at the current location based on Equation 1.

$$D(t_{ref}) = D_o + \sum_{i=0}^{m-1} \max[D_s(t_{ref} + iT) - D_{tx,est}(t_{ref} + iT), 0] \quad \text{[Equation 1]}$$

In Equation 1, $D_s(t_{ref})$ denotes a data quantity needed for playback during an interval of $t_{ref} \leq t < T+t_{ref}$. $D_{tx,est}(t_{ref})$ denotes a data quantity available for transmission based on a transmission quality at the predicted location of the data receiver 410 during the interval of $t_{ref} \leq t < T+t_{ref}$. The data quantity $D_{tx,est}(t_{ref})$ available for transmission is obtained by the second communication environment searcher 425 searching the database 430. $D_o$ denotes a minimum quantity of data to be maintained in a reception buffer to compensate for a difference between an actual transmission data rate and a predicted transmission data rate. A reference quantity of a buffer, also referred to as a minimum quantity of a buffer, refers to a predetermined size of a buffer.

The data receiver 410 receives data greater than a data quantity $D_s$ that is needed for playback for each interval, for example, at "T" intervals, in order to play the data without interruption. When a quantity of the data received is less than $D_s$ in a poor transmission quality area, a quantity of data backlogged in a buffer may decrease. Because of the decrease in the data quantity backlogged in the buffer, buffer underflow may occur and result in intermittent connection in the playback.

In Equation 1, $D(t_{ref})$ denotes a data quantity, during a predetermined interval, calculated by a sum of a data shortage, for example, $\max[D_s(t_{ref}+iT)-D_{tx,est}(t_{ref}+iT),0]$, predicted to occur for each interval and the minimum quantity $D_o$ of the buffer. As illustrated in an example of FIG. 6, the data shortage, for example, $\max[D_s(t_{ref}+iT)-D_{tx,est}(t_{ref}+iT), 0]$, is indicated by a shaded portion of an area. A value obtained by dividing $D(t_{ref})$ by "T" denotes a second data rate that is needed in addition to receive data during a predetermined interval.

The reference quantity $D_o$ of the buffer corresponds to a quantity that allows uninterrupted playback of data in absence of data reception during at least a single interval for example, during an interval "T". The reference quantity $D_o$ is set to be integer multiples, for example, $5D_{s,average}$, of an average value $D_{s,average}$ of $D_s$.

In one example, a quantity of data to be transmitted to the data receiver 410 during a current interval, for example, $t_o \leq t < T+t_o$, at a point in time $t_{ref}=t_o+T$ corresponds to a quantity of data to be used for playback during the current interval, for example, $t_o \leq t < T+t_o$, and to be backlogged in the buffer of the data receiver 410 for a quantity of $D(t_o+T)$ at the point in time $t=t_o+T$.

A transmission data rate, for example, $R_{req}(t_o)$, to be transmitted during the current interval, for example, $t_o \leq t < T+t_o$, is represented by Equation 2 in order to satisfy the aforementioned conditions.

$$R_{req}(t_o) = \frac{D_s(t_o) + D(t_o + T) - d(t_o)}{T} \quad \text{[Equation 2]}$$

$$= R_s(t_o) + \frac{D(t_o + T) - d(t_o)}{T}$$

In Equation 2, $d(t_o)$ denotes a quantity of data backlogged in the buffer of the data receiver 410 at a present point in time, for example, $t=t_o$, and $$R_s(t_o) = \frac{D_s(t_o)}{T}$$

denotes a first data rate needed to receive data during a current interval. As described above, $D(t_{ref})/T$ denotes a second data rate additionally needed to receive data during a predetermined interval based on a change in communication environment information.

Equation 3 is a result of substituting Equation 1 for Equation 2.

$$R_{req}(t_o) = R_s(t_o) + \frac{D_o + \sum_{i=1}^{m} \max[D_s(t_o + iT) - D_{tx,est}(t_o + iT), 0] - d(t_o)}{T} \quad \text{[Equation 3]}$$

Equation 4 is derived from Equation 3.

$$R_{req}(t_o) = R_s(t_o) + \sum_{i=1}^{m} \max[R_s(t_o + iT) - R_{tx,est}(t_o + iT), 0] + \frac{D_o - d(t_o)}{T} \quad \text{[Equation 4]}$$

The data transmitter 420 sets a predicted data rate, for example, $R_{req}(t_o)$, during a current interval by calculating Equation 4 at "T" intervals.

In another example, a transmission data rate actually obtained based on a wireless communication environment may be lower than the predicted data rate, for example, $R_{req}(t_o)$, requested from a physical layer based on Equation 4. In this example, a higher data rate is needed because $$\frac{D_o - d(t_o)}{T}$$

in Equation 4 increases during the current interval. As used herein, $$\frac{D_o - d(t_o)}{T}$$

denotes a data rate obtained by subtracting a quantity of data backlogged in a buffer from a second data rate additionally needed to receive data during a predetermined interval.

Equation 4 is modified to be represented as Equation 5 or Equation 6 in order to compensate for a shortage in a data rate based on limitations of a physical layer.

$$R_{req}(t_o) = \quad \text{[Equation 5]}$$
$$\alpha \left( R_s(t_o) + \sum_{i=1}^{m} \max[R_s(t_o + iT) - R_{tx,est}(t_o + iT), 0] + \frac{D_o - d(t_o)}{T} \right) + \beta$$

$$R_{req}(t_o) = \alpha R_s(t_o) + \quad \text{[Equation 6]}$$
$$\sum_{i=1}^{m} \max[R_s(t_o + iT) - R_{tx,est}(t_o + iT), 0] + \frac{D_o - d(t_o)}{T} + \beta$$

An extra quantity of data may be backlogged in advance by applying a weight, for example, $\alpha$, and a predetermined additional data rate, for example, $\beta$. For example, when $1 \leq \alpha < 2$, $\beta > 2$, the data receiver 410 backlogs, in the buffer, a quantity exceeding a quantity actually required when a communication quality permits during a current interval, and compensates, through the excess quantity, for a difference between the predicted data rate, for example, $R_{req}(t_o)$, and the transmission data rate actually obtained.

Figure 5:
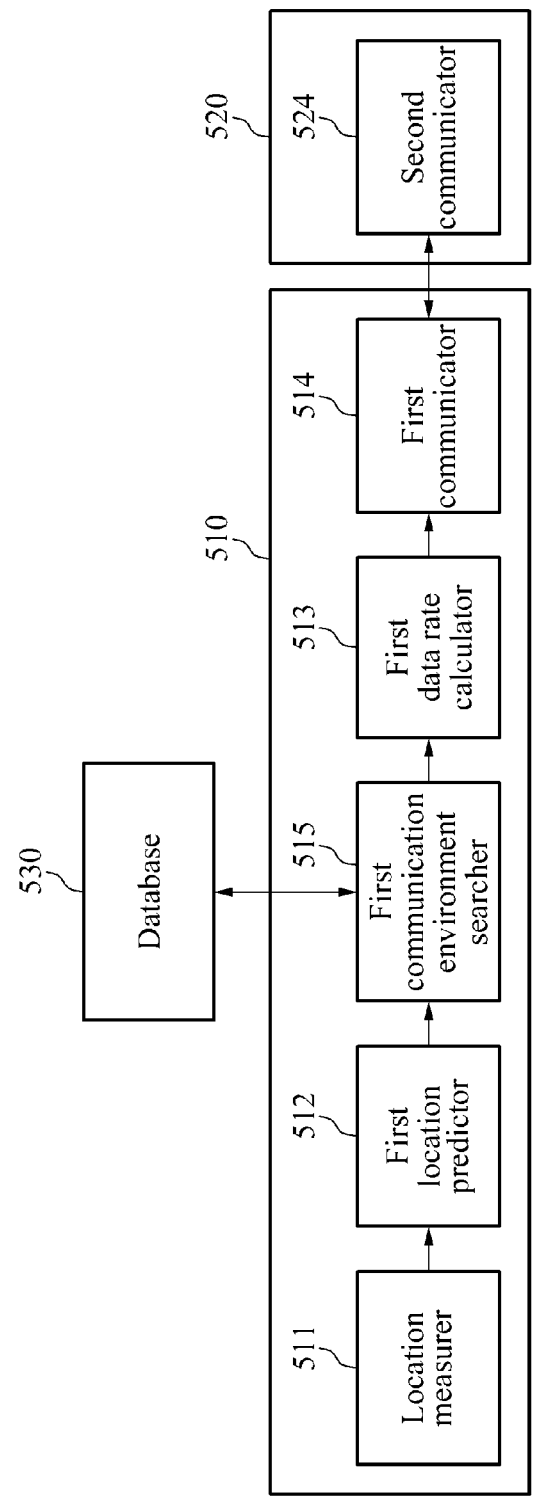
FIG. 5 is a diagram illustrating an example of a configuration of a location-based data receiver.

FIG. 5 is a diagram illustrating an example of a configuration of a location-based data receiver 510.

Referring to FIG. 5, in the location-based data receiver 510, hereinafter also referred to as a data receiver, a first location predictor 512 predicts a moving path of the data receiver 510 based on location information measured by a location measurer 511. A first communication environment searcher 515 of the data receiver 510 searches a transmission data rate along the moving path from a database 530. A first data rate calculator 513 of the data receiver 510 calculates a predicted data rate during a current interval based on one of Equations 4 through 6.

The data receiver 510 requests data transmission based on the predicted data rate from a second communicator 524 of a data transmitter 520 via a first communicator 514. The database 530 may be included inside the data receiver 510, or may be provided outside the data receiver 510, for example, as an external database server. The data receiver 510 receives communication environment information in a vicinity of the data receiver 510 from the database 530 in advance, and uses the information stored in a cache.

The first location predictor 512 and the first communication environment searcher 515 operate in a manner similar to that of the second location predictor 422 and the second communication environment searcher 425 that were previously described with reference to FIG. 4.

In one example, the database 530 provides communication environment information including a data rate between a data transmitter and a data receiver based on a geographical location of the data receiver 510. The communication environment information of the database 530 is established based on information separately collected by measuring a transmission data rate at a plurality of locations via an additional apparatus, for example, an apparatus for measuring a data rate.

In another example, the communication environment information of the database 530 is established based on an actual reception data rate. A data rate updater of the data receiver 510 updates the communication environment information in real time by reflecting the actual reception data rate of the data receiver 510 with respect to the established database 530. In still another example, the database 530 is established based on theoretical communication environment information, for example, a data rate, that is calculated based on equipment, a location, and surrounding topographical features of the data transmitter 520 and the data receiver 510. The database 530 includes a transmission quality calculated by a location of a base station or a terrain.

The location measurer 511 of the data receiver 510 measures a location of the data receiver 510 based on at least one of global positioning system (GPS) information and location information of a network to which the data receiver 510 is connected. For example, the location information of the network to which the data receiver 510 is connected includes surrounding geographical information of the network. In one example, when an area in which the data receiver 510 communicates, for example, a wireless local area network (WLAN or Wi-Fi), includes small cells, the location information of the network includes location information of a current cell and neighboring cells. In another example, the location measurer 511 measures the location of the data receiver 510 based on location information of three cells based on triangulation.

When a maximum data rate between the data receiver 510 and the data transmitter 520 at a current location of the data receiver 510 is limited based on a communication environment in response to a dynamic change in a data rate, the data receiver 510 and the data transmitter 520 may combine heterogeneous types of networks in order to compensate for a shortage in the data rate. For example, when the data receiver 510 receives data through a cellular network, a portion of the data received may be received from a neighboring Wi-Fi network, and an additional band may be secured.

Figure 6:
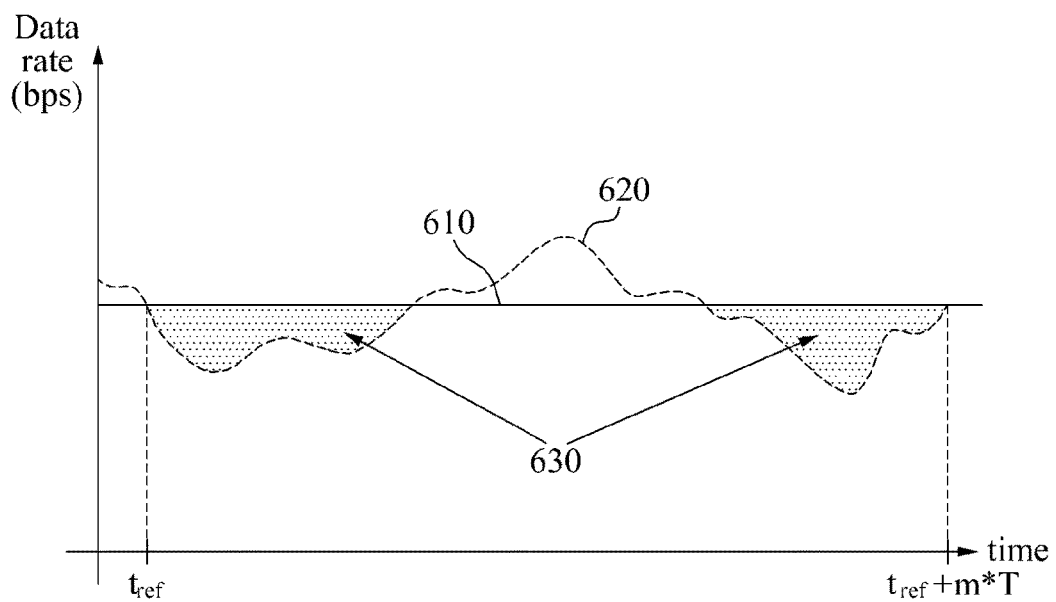
FIG. 6 is a diagram illustrating an example of a data rate to be compensated for based on a location.

FIG. 6 is a diagram illustrating an example of a data rate to be compensated for based on a location. Referring to FIG. 6, a change in a data rate predicted based on a time is illustrated, and an x axis indicates a time and a y axis indicates a data rate.

A required data rate 610 refers to a data rate needed to receive data for each interval. A data rate 620 stored in a database refers to a data rate mapped to a point at which a data receiver passes through at a corresponding point in time, and an additional data quantity 630 refers to an additional quantity of data needed to receive data during a predetermined interval based on a change in communication environment information. The additional data quantity 630 also corresponds to a shortage in the data rate 620 stored in the database with respect to the required data rate 610. A second data rate refers to a data rate needed to receive the additional data quantity during an interval, for example, "T" interval.

Figure 7:
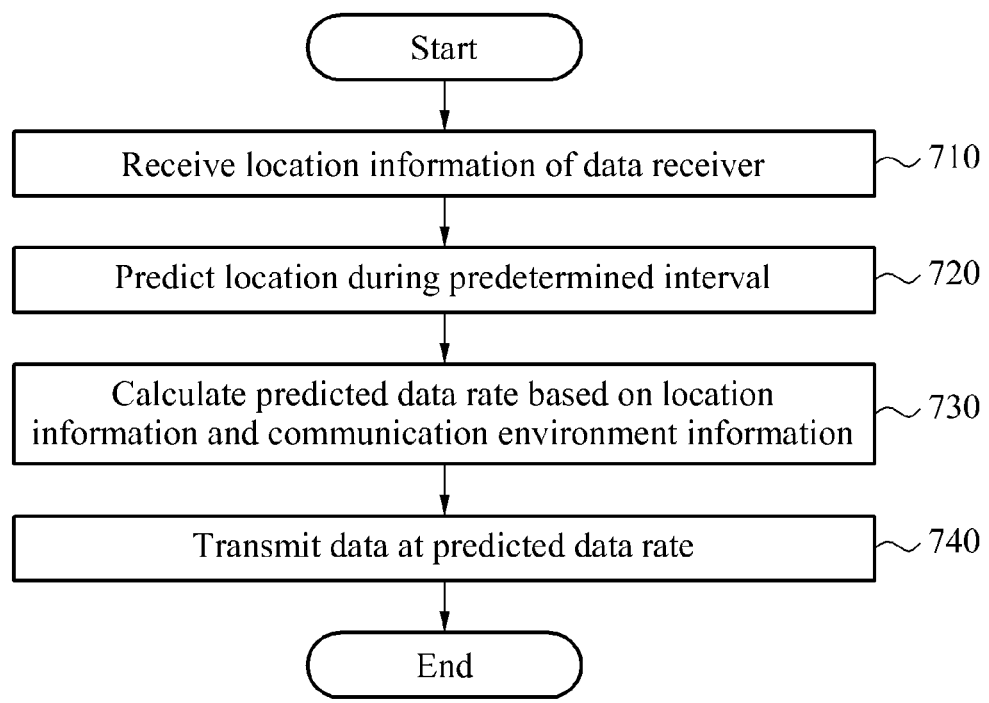
FIG. 7 is a diagram illustrating an example of a method of transmitting data based on a location.

FIG. 7 is a diagram illustrating an example of a method of transmitting data based on a location. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently.

In 710, a location reception unit of a data transmitter receives location information of a data receiver.

In 720, a second location predictor of the data transmitter predicts a location of the data receiver during a predetermined interval. For example, the second location predictor calculates a moving path and a moving speed of the data receiver based on location information received at predetermined intervals. As used herein, the predetermined interval includes, for example, an interval starting from a reference point in time, for example, $t_{ref}$, an interval elapsing for an "X" time period until a "Y" time period, an interval starting from reference point in time elapsing for the "X" time period, and an interval starting from the reference point in time subsequent to an "m" interval.

In 730, a second data rate calculator of the data transmitter calculates a predicted data rate based on location information and communication environment information. For example, the second data rate calculator calculates the predicted data rate based on at least one of a first data rate needed to receive data during a current interval, a second data rate additionally needed to receive data during a predetermined interval based on a change in communication environment information, a quantity of data backlogged in a buffer in advance, and a predetermined reference quantity of the buffer, for example, a minimum quantity of the buffer.

The second data rate calculator determines, to be the predicted data rate, a data rate obtained by subtracting a difference between the predetermined minimum quantity of the buffer at predetermined intervals and the quantity of data backlogged in advance from a value calculated by a sum of the first data rate and the second data rate. In this example, a weight may be applied to at least one of the first data rate, the second data rate, the quantity of data backlogged in advance, and the predetermined minimum quantity of the buffer. A predetermined additional weight may be applied to the predicted data rate.

In 740, a second communicator of the data transmitter transmits data to the data receiver at the predicted data rate.

FIG. 8 is a diagram illustrating an example of a method of receiving data based on a location. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently In 810, a location measurer of a data receiver measures location information of the data receiver. For example, a location of the data receiver is measured based on at least one of GPS information and location information of a network to which the data receiver is connected.

In 820, a first location predictor of the data receiver predicts a location of the data receiver during a predetermined interval. For example, the first location predictor predicts the location of the data receiver during the predetermined interval based on the location information measured by the location measurer. The first location predictor calculates at least one of a moving path and a moving speed of the data receiver based on location information measured at predetermined intervals.

In 830, a first data rate calculator of the data receiver calculates a predicted data rate based on location information and communication environment information. For example, the first data rate calculator calculates a predicted data rate associated with continuity of data playback during a predetermined interval based on a predicted location and communication environment information corresponding to a location of the data receiver provided from a database. The predicted data rate includes a data rate to receive a quantity of data needed for continuous playback of multimedia during a predetermined interval.

The first data rate calculator calculates the predicted data rate based on at least one of a first data rate needed to receive data during a current interval, a second data rate additionally needed to receive data based on a change in communication environment information during a predetermined interval, a quantity of data backlogged in a buffer in advance, or a predetermined reference quantity of the buffer.

In one example, the first data rate calculator determines the predicted data rate by reducing from the sum of the first data rate and the second data rate, a difference between the predetermined minimum quantity of a buffer at predetermined intervals and a quantity of data backlogged in advance. In another example, the first data rate calculator calculates the predicted data rate by applying a weight to at least one of the first data rate, the second data rate, the quantity of data backlogged in advance, and the minimum quantity of the buffer The first data rate calculator may apply a predetermined additional data rate to the predicted data rate.

In 840, a first communicator of the data receiver requests data transmission based on the predicted data rate from a data transmitter. The buffer of the data receiver backlogs data received in advance based on the predicted data rate.

In another example, the data receiver includes a data rate updater to map a data rate when the data receiver directly receives data to a location of the data receiver, and send feedback to the database.

A location-based data transmission/reception system according to an example includes a data receiver, a database, and a data transmitter.

The data receiver measures location information of the data receiver. In one example, the data receiver calculates a predicted data rate based on location information and communication environment information to transmit the predicted data rate to the data transmitter. The data is transmitted to the data receiver based on the predicted data rate received by the data transmitter.

In another example, the data receiver transmits location information to the data transmitter, and the data transmitter calculates a predicted data rate based on the location information, and transmits data to the data receiver.

The database stores communication environment information corresponding to location information. For example, the database collects a data rate experienced when the data receiver previously received data.

The data transmitter transmits data to the data receiver based on location information and a predicted data rate calculated based on communication environment information. For one example, when the data transmitter receives the predicted data rate from the data receiver, the data transmitter transmits data to the data receiver based on the predicted data rate received.

In another example, when the data transmitter receives location information from the data receiver, the data transmitter calculates a predicted data rate based on the location information and communication environment information, and transmits data to the data receiver at the predicted data rate.

According to another example, the data transmitter predicts a location of a data receiver and a connection quality using location information, and dynamically changes a size of a buffer to backlog data to be played in advance.

According to another example, the data transmitter may prevent interrupted connection of services provided to a user when the user passes through a poor connection quality area. Also, an average quantity of a buffer used may be reduced, and a quantity of a power consumed by a data receiver may be optimized.

According to an example, there is provided a data transmitter and a data receiver that may be applied to broadcasting services supporting a two-way service or multimedia transmission services such as video-on-demand (VOD) using a data network, for example, the Internet.

The processes, functions, and methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

As a non-exhaustive illustration only, a terminal or device described herein may refer to mobile devices such as, for example, a cellular phone, a smart phone, a wearable smart device (such as, for example, a ring, a watch, a pair of glasses, glasses-type device, a bracelet, an ankle bracket, a belt, a necklace, an earring, a headband, a helmet, a device embedded in the cloths or the like), a personal computer (PC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, and devices such as a high definition television (HDTV), an optical disc player, a DVD player, a Blue-ray player, a setup box, robot cleaners, or any other device capable of wireless communication or network communication consistent with that disclosed herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A mobile data receiver, the mobile receiver comprising: one or more processors configured to:
   predict a location of the mobile receiver based on location information of the mobile receiver; and
   calculate a predicted wireless data rate during an predetermined next interval based on mobile wireless communication environment information corresponding to the location information of the mobile receiver and the predicted location, the predicted wireless data rate being determined based on a first data rate, a second data rate, and a difference between a reference quantity of a buffer of the mobile receiver and a quantity of previously-backlogged data, the first data rate being a data rate for wirelessly receiving data during a predetermined current interval, and the second data rate being another data rate for wirelessly receiving data during the predetermined next interval; and
   wirelessly transmit the predicted wireless data rate, calculated by the one or more processors of the mobile receiver, to a data transmitter,
   wherein the one or more processors are further configured to control a backlogging of data wirelessly received in advance from the data transmitter based on the predicted wireless data rate.

2. The mobile receiver of claim 1, wherein the one or more processors are further configured to calculate at least one of a moving path or a moving speed of the mobile receiver based on location information measured at intervals.

3. The mobile receiver of claim 1, wherein the one or more processors are further configured to receive the data at the predicted wireless data rate from the data transmitter.

4. The mobile receiver of claim 1, wherein, for the calculation of predicted wireless data rate, the one or more processors are further configured to determine the predicted wireless data rate by reducing, from a sum of the first data rate and the second data rate, the difference between the reference quantity of the buffer and the quantity of the data previously backlogged in advance from a sum of the first data rate and the second data rate.

5. The mobile receiver of claim 1, wherein the one or more processors are further configured to calculate the predicted wireless data rate by applying a weight to at least one of the first data rate, the second data rate, the quantity of the data previously backlogged in advance, or the reference quantity of the buffer.

6. The mobile receiver of claim 1, wherein the one or more processors are further configured to apply an additional data rate to the predicted wireless data rate.

7. The mobile receiver of claim 1, wherein the one or more processors are further configured to measure the location information of the mobile receiver based on at least one of global positioning system (GPS) information or location information of a network to which the mobile receiver is connected.

8. The mobile receiver of claim 1, wherein the one or more processors are further configured to update the communication environment information based on a data reception rate of the mobile receiver at a position of the location information of the mobile receiver.

9. The mobile receiver of claim 1, wherein the communication environment information is provided by a database, and the communication environment information includes at least one of the first data rate corresponding to a current location of the mobile receiver, the second data rate corresponding to the predicted location of the mobile receiver, or a third data rate corresponding to a predetermined location.

10. The mobile receiver of claim 1, wherein the predicted wireless data rate is associated with a data rate required for uninterrupted play of a data.

11. The mobile receiver of claim 2, wherein the one or more processors are further configured to search for a transmission data rate along the moving path of the mobile receiver.

12. A location-based data transmitter, the transmitter comprising:
   one or more processors configured to: wirelessly receive location information of a mobile data receiver;
   predict a location of the mobile data receiver during an predetermined next interval based on the location information; and
   calculate a first predicted wireless data rate during the predetermined next interval based on mobile wireless communication environment information corresponding to the location information of the mobile data receiver and the predicted location, the first predicted wireless data rate being determined based on a first data rate, a second data rate, and a difference between a reference quantity of a buffer of the mobile data receiver and a quantity of data backlogged in advance, the first data rate being a data rate for wirelessly receiving data during a predetermined current interval, and the second data rate being another data rate for wirelessly receiving data during the predetermined next interval; and
   wirelessly transmit data to the mobile data receiver based on the calculated first predicted wireless data rate,
   wherein in response to a second predicted data rate being calculated by the mobile data receiver and the second predicted data rate being wirelessly received from the mobile data receiver, the one or more processors are configured and controlled to wirelessly transmit the data to the mobile data receiver based on the wirelessly received second predicted data rate.

13. The transmitter of claim 12, wherein the one or more processors are further configured to calculate a moving path or a moving speed of the mobile data receiver based on the location information received at intervals.

14. The transmitter of claim 12, wherein, for the calculation of predicted wireless data rate, the one or more processors are further configured to determine the first predicted wireless data rate by reducing, from a sum of the first data rate and the second data rate, the difference between the reference quantity of the buffer and the quantity of the data backlogged in advance from a sum of the first data rate and the second data rate.

15. The transmitter of claim 12, wherein the one or more processors are configured to calculate the first predicted wireless data rate by applying a weight to at least one of the first data rate, the second data rate, the quantity of the backlogged data, or the reference quantity backlogged in advance.

16. The transmitter of claim 12, wherein the one or more processors are further configured to apply an additional data rate to the first predicted wireless data rate.

17. A method of receiving data based on a location, the method comprising:
- predicting a location of a mobile location-based data receiver during a predetermined next interval based on location information of the mobile data receiver;
- calculating, by one or more processor of the mobile data receiver, a predicted wireless data rate during the predetermined next interval based on mobile wireless communication environment information corresponding to the location information of the mobile data receiver and the predicted location, the predicted wireless data rate being determined based on a first data rate, a second data rate, and a difference between a reference quantity of a buffer of the mobile data receiver and a quantity of backlogged data, the first data rate being a data rate for wirelessly receiving data during a predetermined current interval, and the second data rate being another data rate for wirelessly receiving data during the predetermined next interval;
- wirelessly transmitting the predicted wireless data rate, calculated by the one or more processors of the mobile data receiver, to a data transmitter; and
- wirelessly receiving, from the data transmitter, and backlogging the data, at the mobile data receiver and in advance, based on the predicted wireless data rate.

18. The method of claim 17, wherein the calculating comprises: calculating the predicted wireless data rate based on at least one of a-the first data rate required to receive data during a-the current time interval, a-the second data rate required to receive the data during the predetermined next interval based on a change in the communication environment information, the quantity of the data backlogged in a-the buffer in advance, or the reference quantity of the buffer.

19. The method of claim 17, further comprising measuring the location of the mobile data receiver based on at least one of global positioning system (GPS) information or location information of a network to which the mobile receiver is connected.

20. The method of claim 17, further comprising: mapping a data rate when the mobile data receiver receives the data to the location of the mobile data receiver, and sending feedback to the database.

21. A method of receiving uninterrupted data based on a location, the method comprising:
- determining an amount of data to be stored in a buffer of a mobile receiver for uninterrupted execution of the data during a predetermined next period of time;
- predicting a location of the mobile receiver during the predetermined next period;
- calculating, by the mobile receiver, a wireless data transmission rate during the predetermined next period based on mobile wireless communication environment information corresponding to the location and the predicted location, the wireless data transmission rate being determined based on a first data rate, a second data rate, and a difference between a reference quantity of a buffer of the mobile receiver and a quantity of backlogged data, the first data rate being a data rate for wirelessly receiving data during a predetermined current period, and the second data rate being another data rate for wirelessly receiving data during the predetermined next period;
- wirelessly transmitting the wireless data transmission rate, calculated by the mobile receiver, to a data transmitter; and
- wirelessly receiving the uninterrupted data, in advance from the data transmitter, based on the wireless data transmission rate.

22. The method of claim 21, wherein the communication environment information is provided by a database, and the communication environment information includes at least one of the first data rate corresponding to a current location of the mobile receiver, the second data rate corresponding to the predicted location of the mobile receiver, or a third data rate corresponding to a predetermined location.

23. The method of claim 22, further comprising providing feedback information comprising the wireless data transmission rate and the location of the mobile receiver when the mobile receiver received the uninterrupted data.

24. The method of claim 21, further comprising maintaining an additional amount of data in the buffer to compensate for a difference between an actual data transmission rate and the calculated wireless data transmission rate.

* * * * *